United States Patent
Okamura et al.

[11] Patent Number: 6,066,936
[45] Date of Patent: May 23, 2000

[54] ELECTRICAL STORAGE SYSTEM MADE OF CAPACITORS

[75] Inventors: Michio Okamura, Kanagawa; Akinori Mogami, Tokyo, both of Japan

[73] Assignee: Jeol Ltd., Tokyo, Japan

[21] Appl. No.: 09/173,110

[22] Filed: Oct. 15, 1998

[30] Foreign Application Priority Data

Oct. 17, 1997 [JP] Japan .................................. 9-285041

[51] Int. Cl.$^7$ ...................................................... H02J 7/00
[52] U.S. Cl. ............................................ 320/104; 320/103
[58] Field of Search .................................. 320/104, 103, 320/150, DIG. 21

[56] References Cited

U.S. PATENT DOCUMENTS

| | | | |
|---|---|---|---|
| 4,914,393 | 4/1990 | Yoshido | 320/DIG. 21 |
| 5,713,426 | 2/1998 | Okamura | 318/139 |
| 5,734,205 | 3/1998 | Okamura et al. | 320/116 |
| 5,880,951 | 3/1999 | Inaba | 363/144 |

*Primary Examiner*—Peter S. Wong
*Assistant Examiner*—Lawrence Luk
*Attorney, Agent, or Firm*—Webb Ziesenheim Logsdon Orkin & Hanson, P.C.

[57] ABSTRACT

There is disclosed an electrical storage system comprising capacitors that are prevented from deteriorating at elevated temperatures. The electrical storage system is adapted for use in a hybrid electric vehicle or electric vehicle. The storage system comprises a bank of capacitors, a charger for charging the capacitor bank, a temperature switch connected across the capacitor bank and a discharge resistor connected in series with the temperature switch. The temperature switch is closed at a limit temperature (e.g., 70° C.) at which deterioration of the capacitors can be neglected in a fully charged condition. When the temperature of the capacitor bank reaches the limit value, the temperature switch is closed. The capacitor bank is discharged via both the temperature switch and the discharge resistor. This suppresses deterioration of the capacitors at elevated temperatures.

13 Claims, 3 Drawing Sheets

ELECTRICAL STORAGE SYSTEM MADE OF CAPACITORS

FIELD OF THE INVENTION

The present invention relates an electrical storage system made of capacitors and adapted for use in a hybrid electric vehicle or an electric vehicle and, more particularly, to an electrical storage system capable of preventing its capacitors from being deteriorated due to elevated temperatures.

DESCRIPTION OF THE PRIOR ART

Hybrid vehicles and electric vehicles have been proposed in which a capacitor bank consisting of electrical double layer capacitors connected in series is mounted as a power source. To put these vehicles into practical use, it is important to solve the problem of deterioration of the capacitors due to elevated temperatures, especially in high-temperature areas.

When an automobile is running or parks in sunlight in summer, there is the possibility that the temperature of the automobile body or components installed in the automobile reaches 70° C. or above. Since capacitors store electric charge by physical phenomena, the capacitors tend to have higher maximum usable temperatures than secondary cells that store electric charge by chemical reactions. However, at or above 70° C., some countermeasure against deterioration is necessary.

SUMMARY OF THE INVENTION

It is an object of the present invention to provide an electrical storage system comprising capacitors that are prevented from being deteriorated at high temperatures.

As mentioned previously, capacitors have better resistance to high temperatures than secondary cells. We have confirmed that when capacitors are fully discharged, they deteriorate to a tolerable extent even under high-temperature environments of 100° C. or above. However, as more electric charge is stored in capacitors, the deterioration rate increases. Under a fully charged condition, the deterioration rate above 70° C. is no longer tolerated. FIG. 6 shows the relation of the depth of discharge d at which the capacitor deterioration can no longer be permitted to temperature T. Note that FIG. 6 merely gives an example of the relation. This relation varies with the required capacitor life.

In view of the foregoing, the present invention has been made. An electrical storage system in accordance with the present invention is characterized in that if the temperature of the capacitors exceeds a limit temperature, the capacitors are discharged to thereby lower the terminal voltage. In this way, the capacitors are prevented from deteriorating.

An electrical storage system in accordance with the present invention comprises a capacitor bank, a charging means for charging the capacitor bank, a temperature-detecting means for detecting temperature on or near the capacitor bank and a discharging means capable of discharging the capacitor bank. The discharging means discharges the capacitor bank, provided that the temperature detected by the temperature-detecting means exceeds a preset temperature.

Preferably, the discharge by the discharging means is ended when the voltage across the capacitor bank reaches a preset limit value. Where top priority is given to the capacitor life at the cost of the practicability, the capacitor bank may be discharged fully. The limit value of the terminal voltage may decrease as the detected temperature rises.

Other objects and features of the invention will appear in the course of the description thereof, which follows.

DESCRIPTION OF THE PREFERRED EMBODIMENTS

Figure 1:
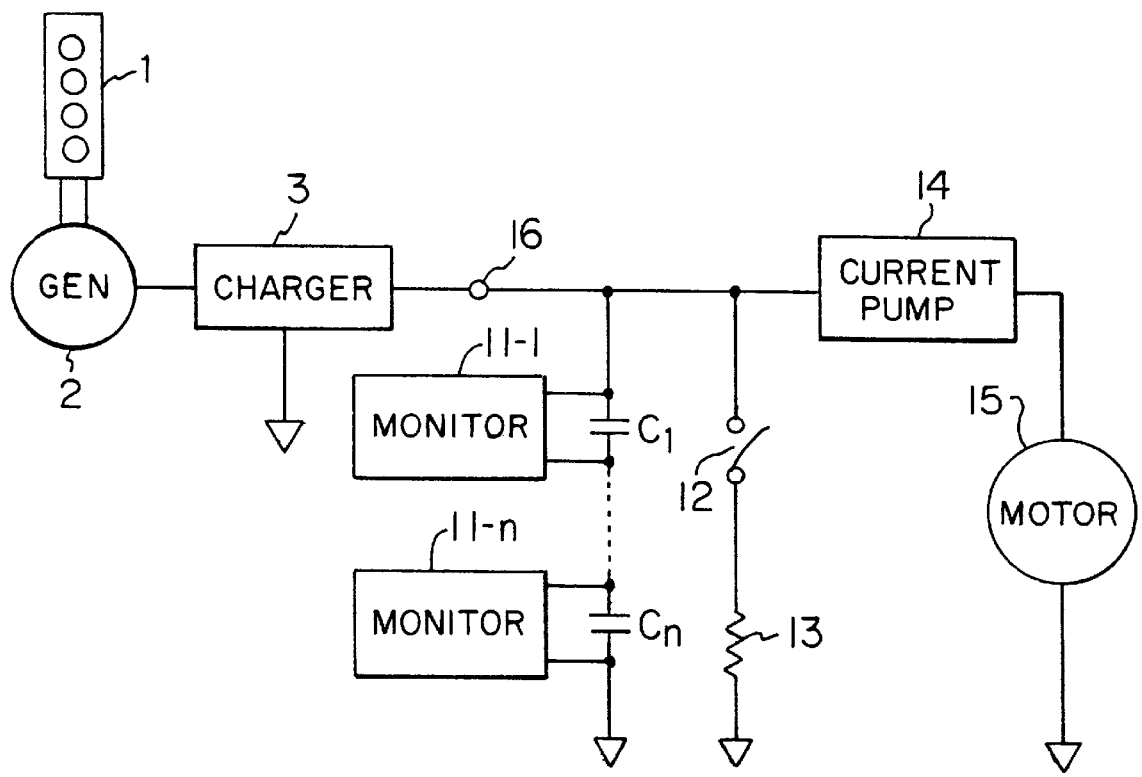
FIG. 1 is a schematic block diagram of an electrical storage system in accordance with the present invention.

Referring to FIG. 1, there is shown an electrical storage system made up of capacitors, the storage system being built in accordance with the present invention. This storage system is mounted in a hybrid vehicle as shown in FIG. 2.

Figure 2:
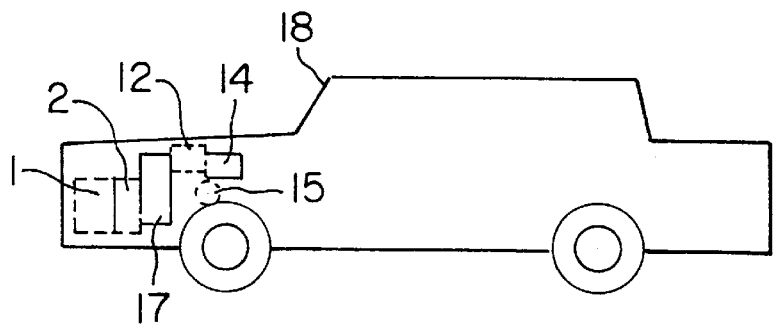
FIG. 2 is a pictorial view of a hybrid vehicle in which the storage system shown in FIG. 1 is mounted.

In FIGS. 1 and 2, electrical double layer capacitors $C_1-C_n$ for storing electrical energy are connected in series. Parallel monitors 11-1 to 11-n are connected in parallel with the capacitors $C_1-C_n$, respectively. Each parallel monitor is a parallel-type, charging-limiting circuit for partially bypassing the charging current around the corresponding capacitor according to the state of charge (terminal voltage) of the capacitor and for fully bypassing the charging current when a fully charged state is attained. The parallel combinations of these capacitors $C_1-C_n$ and the parallel monitors 11-1 to 11-n form an electrical storage system as a capacitor bank with parallel monitors. These parallel combinations are connected in series such that the number of the stages corresponds to the required output voltage.

A generator 2 driven by an internal combustion engine 1 of the vehicle produces electrical energy. The electrical energy is supplied to the electrical storage system via a charger 3 and via a terminal 16 and stored in the storage system.

The electrical energy stored in the capacitor bank is supplied to a driving electric motor 15 via a bidirectional current pump 14, the motor 15 being connected to the drive wheels of the vehicle. This current pump 14 uses a switching converter producing bidirectional output to control the current supplied to the motor 15 from the capacitor bank. During regenerative braking, regenerative electric power generated by the motor 15 is allowed to be supplied to the capacitor bank. Thus, the capacitor bank is charged.

A temperature switch 12 is connected across the capacitor bank and used to short out the bank. The switch 12 detects the temperature on or near the capacitor bank and is turned on. A discharge resistor 13 connected in series with the temperature switch 12 limits the discharging current when the switch 12 is closed to within an appropriate range, thus reducing the amount of electric power consumed.

Referring to FIG. 2, where the electrical storage system 17, consisting of the capacitor bank with the parallel monitors, the bidirectional current pump 14, the motor 15, etc., is mounted in the front engine compartment, for example, the temperature switch 12 is mounted on or near the storage system 17.

In this structure, the temperature at which the temperature switch 12 is turned on is selected to be the highest one of temperatures (e.g., 70° C.) at which deterioration of the capacitors in the aforementioned fully charged condition can be neglected. Therefore, if the temperature of the capacitor bank reaches or exceeds this limit value, the temperature switch 12 is closed. This discharges the capacitor bank via both temperature switch 12 and discharge resistor 13.

If the capacitor bank is in a fully charged condition prior to electric discharge, electric charge stored in the electrical storage system is compulsively released and thus the storage system is fully discharged. Consequently, deterioration of the capacitors due to high temperatures can be reduced to a minimum.

During compulsive discharge caused by the temperature switch, charging is meaningless. Therefore, it is desired to stop the charger 3 from charging the capacitors by detecting closure of the temperature switch 12. When the capacitor temperature falls below the limit temperature described above, the temperature switch 12 is opened. Under this condition, the capacitors are rechargeable.

Instead of the temperature switch in the embodiment described above, an ordinary switch (e.g., a semiconductor switch), a temperature sensor and a temperature-judging circuit may be mounted. The temperature sensor and the temperature-judging circuit judge the preset temperature, producing a decision signal. The decision signal is used to close the switch, thus discharging the capacitor bank.

Hybrid electric vehicles (HEVs) incorporating both an internal combustion engine and an electric motor are broadly classified as parallel configuration or series configuration according to the driving method. In the parallel configuration, the drive wheels are driven by an internal combustion engine and by an electric motor. In the series configuration, the drive wheels are driven only by an electric motor; an internal combustion engine is used only to generate electric power supplied to the motor. The present invention can be applied to both configurations.

In the embodiment described above, if the temperature rises above a limit value (e.g., 70° C.), the capacitors are fully discharged via the discharge resistor 13. Thus, operation of the vehicle is inevitably impeded.

Figure 3:
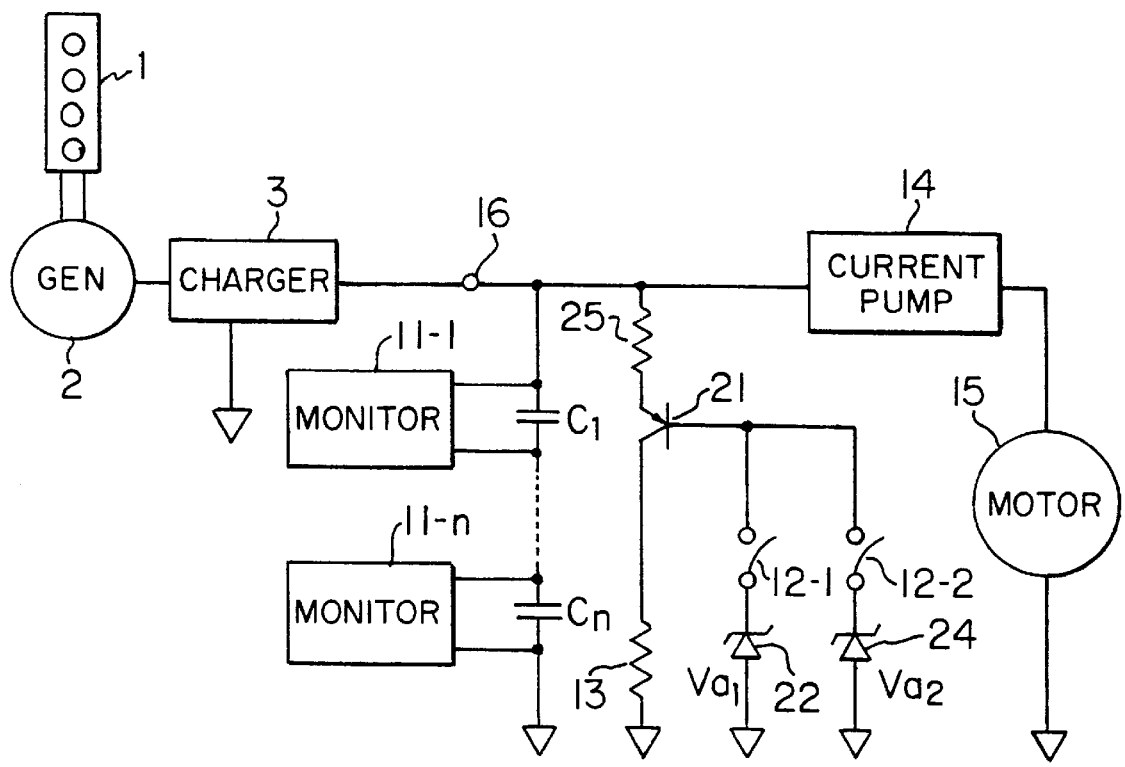
FIG. 3 is a diagram similar to FIG. 1, but showing another electrical storage system in accordance with the present invention.

In contrast, in the embodiment illustrated in FIG. 3, the impediment to operation of the vehicle can be reduced in practical situations by preventing full discharge. Note that like components are indicated by like reference numerals in both FIGS. 1 and 3. In the embodiment of FIG. 3, a capacitor bank is shorted out by a switching device 21, such as a switching transistor. A parallel combination of two temperature switches 12-1 and 12-2 is connected with the control electrode or the base of this switching device 21. A resistor 25 inserted on the side of the emitter of the switching transistor is a current-limiting device. Reference voltage-generating devices 22 and 24 are connected in series with the temperature switches 12-1 and 12-2, respectively.

In the structure described above, temperatures Ta1 and Ta2 at which the temperature switches 12-1 and 12-2 are respectively closed are set to 70° C. and 100° C., respectively, for example. The reference voltage-generating devices 22 and 24 connected with their respective temperature switches generate reference voltages $Va_1$ and $Va_2$, respectively. Let Vm be the voltage developed across the capacitor block in a fully charged condition. The reference voltage $Va_1$ is selected equal to $Vm/\sqrt{2}$. The reference voltage $Va_2$ is selected equal to $Vm/2$.

If the temperature of the capacitor block in a fully charged condition (i.e., the depth of charge d=1) rises to 70° C., the temperature switch 12-1 is closed. As a result, the transistor 21 is turned on, initiating discharge of the capacitor block. The terminal voltage of the capacitor block begins to drop from Vm and arrives at $Va_1$, whereupon the transistor is turned off. This stops the discharge. As a result, the terminal voltage of the capacitor block is maintained at $Va_1$. At this time, the depth of discharge is 0.5, that is, the amount of electric charge stored in the capacitor block is half the amount of charge stored in a fully charged condition.

If the temperature of the capacitor block rises further and reaches 100° C., the temperature switch 12-2 is closed. The reference voltage $Va_2$ is supplied to the base of the transistor 21 via the temperature switch 12-2. This turns on the switching transistor 21 again. Electric discharge is restarted. Concomitantly, the terminal voltage of the capacitor block drops to $Va_2$, whereupon the transistor 21 is turned off. In consequence, the electric discharge is stopped. At this time, the depth of discharge is 0.25, that is, the amount of electric charge stored in the capacitor block is one-fourth of the amount of charge stored in a fully charged condition.

Figure 6:
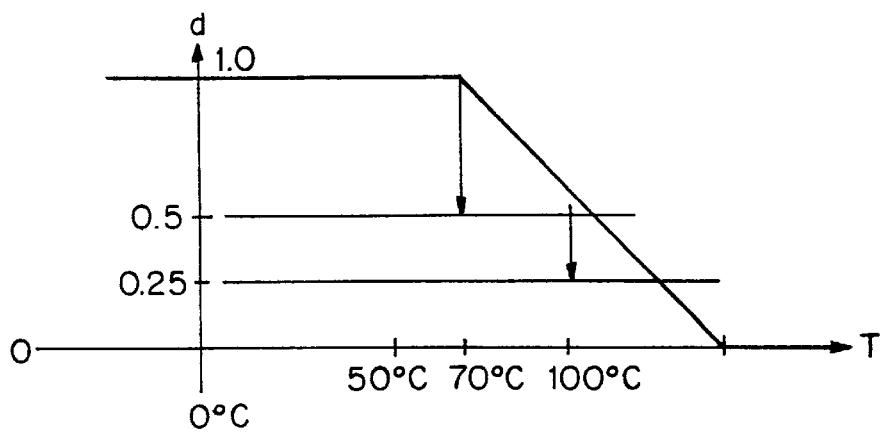
FIG. 6 is a graph showing the relation of the depth of charge d of a capacitor at which deterioration is no longer tolerated to temperature T.

As can be seen from the diagram of FIG. 6, the maximum tolerable temperature at which deterioration of the capacitor block can be neglected at a depth of charge of 0.5 is higher than 100° C. At a depth of charge of 0.25, the maximum tolerable temperature is still higher. Therefore, deterioration of the capacitors due to high temperatures can be minimized over a wide temperature range. Furthermore, electric charge can be held in the capacitor block at a depth of charge at which deterioration can be neglected. Consequently, the worst situation, such as stoppage of the vehicle operation, can be circumvented.

In the embodiment described above, the temperature switches 12-1 and 12-2 may be replaced by ordinary switches (such as semiconductor switches), a temperature sensor and a temperature-judging circuit. The temperature sensor and the temperature-judging circuit cooperate to judge the preset temperatures. The resulting decision signal is used to close the switches. The capacitor block is discharged to the limit values corresponding to the respective preset temperatures.

Figure 5:
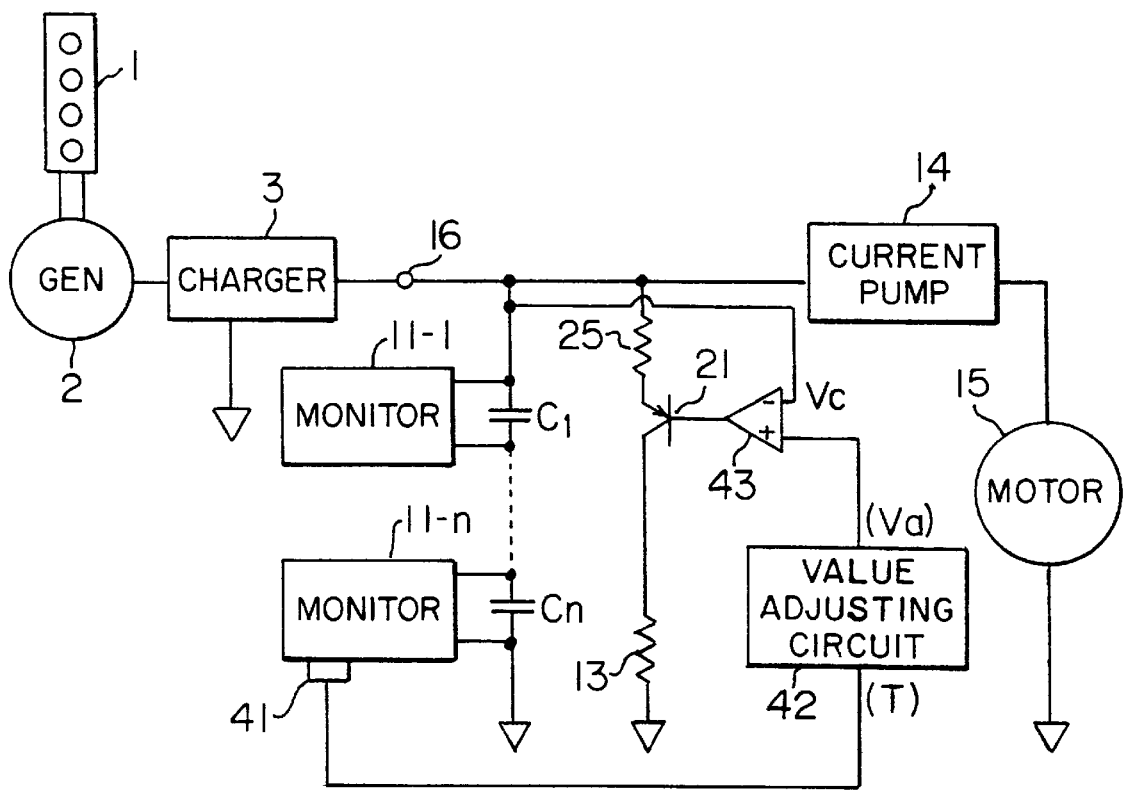
FIG. 5 is a diagram similar to FIG. 1, but showing a yet other electrical storage system in accordance with the present invention.

FIG. 5 is a circuit diagram of an embodiment of the invention for more accurately controlling the voltage across a capacitor block according to temperature. In FIG. 5, a temperature sensor 41 detects the temperature of the capacitor block. The output signal from the sensor 41 is sent to a terminal voltage limit value-adjusting circuit 42. This adjusting circuit 42 produces a terminal voltage limit value Va according to an entered capacitor temperature T, using a capacitor temperature (T)-terminal voltage limit value (Va) conversion function as depicted in FIG. 6. The output terminal voltage limit value Va is sent to a differential amplifier 43, which in turn produces the difference between the terminal voltage limit value Va and the terminal voltage Vc of the capacitor block. The resulting difference signal is fed to the base of the switching transistor 21.

In this structure, the terminal voltage limit value-adjusting circuit 42 accurately adjusts the terminal voltage limit value Va so as to decrease as the temperature detected by the temperature sensor 41 rises. The transistor 21 causes electric discharge in such a way that the terminal voltage of the capacitor block becomes equal to the adjusted terminal voltage value Va. As a result, the terminal block of the capacitor block is adjusted accurately according to the terminal voltage.

The terminal voltage limit value-adjusting circuit 42 adjusts the terminal voltage limit value Va according to the capacitor block temperature in an analog manner by taking out the output signal from the temperature sensor 41 via an analog nonlinear device. In this case, the limit value varies continuously. Furthermore, various values of the terminal voltage limit value Va differing by equal increments and corresponding to various temperature values may be previously prepared. One is selected from these values according to the signal indicating the detected temperature. In this case, the limit value varies in discrete steps according to the capacitor block temperature.

Figure 4:
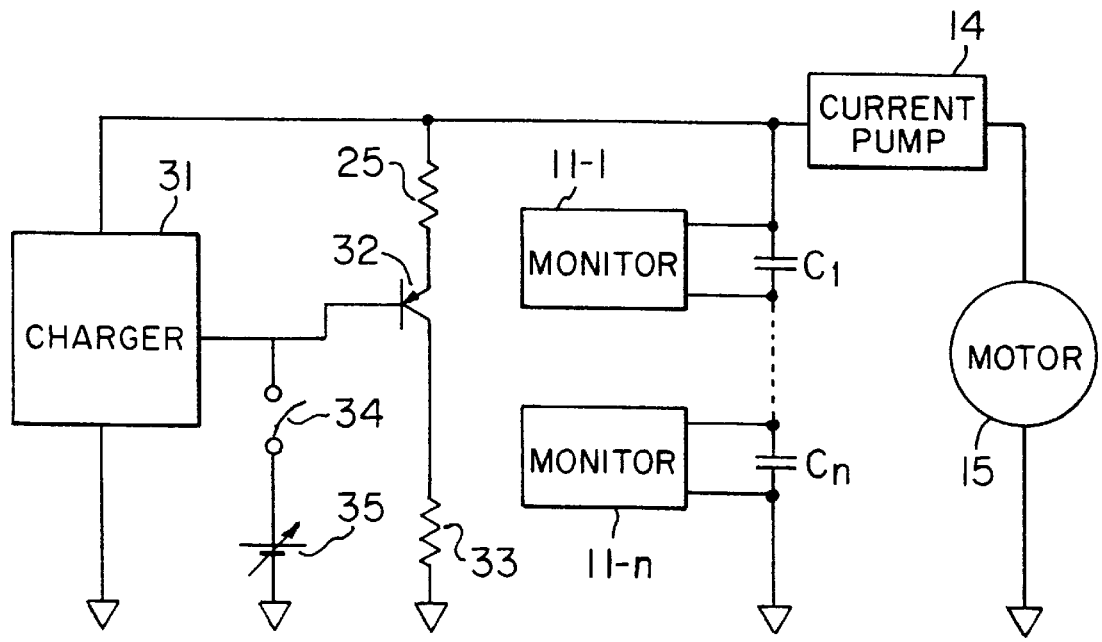
FIG. 4 is a diagram similar to FIG. 1, but showing a further electrical storage system in accordance with the present invention.

FIG. 4 shows a further electrical storage system in accordance with the present invention. This storage system is used while appropriately charged. The charging level by a charger is limited according to control of the terminal voltage using electric discharge.

Referring to FIG. 4, a temperature switch 34 and a reference voltage-generating device 35 are substantially identical with the temperature switch 12 and the reference voltage-generating device 22, respectively, of the embodiment illustrated in FIG. 3. In this embodiment of FIG. 4, when the temperature switch 34 is closed at a given temperature, a signal indicative of the terminal voltage limit value $Va_1$ is supplied to the charger 31. This charger 31 brings a target charging voltage into agreement with the limit value $Va_1$ according to the signal indicative of the terminal voltage limit value $Va_1$.

In this structure, if the temperature rises to 70° C. and to thereby close the temperature switch 34, and if the terminal voltage of the capacitor bank is in excess of the terminal voltage limit value $Va_1$ of the reference voltage-generating device 35, the switching transistor 21 conducts. This discharges the capacitor bank via the discharge resistor 33 until the terminal voltage reaches the limit value $Va_1$.

The capacitor bank is charged while the temperature switch 34 is closed. When the capacitor bank is charged up to the terminal voltage limit value $Va_1$, the charger 31 stops the charging.

Instead of the temperature switch 12 in the embodiment described above, an ordinary switch (e.g., a semiconductor switch), a temperature sensor and a temperature-judging circuit may be used. The temperature sensor and the temperature-judging circuit judge the set temperature. The obtained decision signal is used to close the switch, thus discharging the capacitor bank to the limit value.

It is to be understood that the present invention is not limited to the embodiments described above but rather various changes and modifications are possible. For example, in the embodiments of FIGS. 3 and 5, the limit value Va of the terminal voltage can be supplied to the charging circuit. This permits the transistor 21 to induce electric discharge. The charging by the charging circuit is limited to the limit value of the terminal voltage while the terminal voltage of the capacitor bank is limited to the limit value $Va_1$, $Va_2$ or Va.

In the aforementioned embodiments, the present invention is applied to an electrical storage system comprising capacitors and mounted in a hybrid electric vehicle. The invention is also applicable to an electrical storage system mounted in an agricultural machine exposed to high temperatures under sunlight and other electrical storage systems used in environments where the machine is temporarily exposed to high temperatures.

As can be seen from the description provided thus far, in an electrical storage system in accordance with the present invention, the terminal voltage of the capacitor block is lowered at high temperatures. The discharging circuit and the charger are controlled according to temperature such that the system is used in a charging voltage range of lower voltages. Hence, the capacitors are prevented from deteriorating. Consequently, the electrical storage system can maintain high reliability over a much wider temperature range than batteries and has longer life.

Having thus described our invention with the detail and particularity required by the Patent Laws, what is desired protected by Letters Patent is set forth in the following claims.

What is claimed is:

1. An electrical storage system having a bank of capacitors for supplying a load, comprising:
   a charging means for charging said bank of capacitors;
   a discharging means in parallel with the load capable of discharging said bank of capacitors; and
   a temperature-detecting means for detecting temperature on or near said bank of capacitors, said temperature-detecting means causing said discharging means to discharge said bank of capacitors if the temperature detected by said temperature-detecting means is in excess of a preset temperature.

2. The electrical storage system of claim 1, wherein said discharging means discharges said bank of capacitors substantially fully.

3. The electrical storage system of claim 1, wherein there is further provided a setting means for setting a limit value of a voltage developed across said bank of capacitors, and wherein said discharging means is equipped with a control means for stopping the discharging when the voltage developed across said bank of capacitors reaches said limit value set by said setting means.

4. The electrical storage system of any one of claims 1 to 3, wherein said temperature-detecting means is a temperature switch that is reversed in state at said preset temperature, and wherein said discharging means starts discharging in response to reversion of said temperature switch.

5. The electrical storage system of any one of claims 1 to 3, wherein said temperature-detecting means comprises a temperature sensor and a temperature-judging circuit, and wherein said discharging means starts discharging according to temperature judged by said temperature-judging means.

6. The electrical storage system of claim 3, wherein charging of said bank of capacitors by said charging means is limited by said limit value while said control means is limiting the voltage developed across said bank of capacitors to said limit value.

7. The electrical storage system of claim 3, wherein:
   (A) said temperature-detecting means detects first and second preset temperatures that are different from each other and produces an output signal indicative of the first or second preset temperature;
   (B) said setting means sets first and second terminal voltage limit values corresponding to said first and second temperatures, respectively; and
   (C) said control means causes said discharging means to discharge said bank of capacitors according to the output signal from said temperature-detecting means until the voltage developed across said bank of capacitors drops to a first or a second preset voltage corresponding to said first or second preset temperature, respectively.

8. The electrical storage system of claim 7, wherein said temperature-detecting means comprises temperature switches that are reversed in state at the preset temperatures, respectively.

9. The electrical storage system of claim 7, wherein said temperature-detecting means comprises a temperature sensor and a temperature-judging circuit.

10. The electrical storage system of any one of claims 7–9, wherein charging of said bank of capacitors by said charging means is limited by the set limit value while said control means is limiting the voltage developed across said bank of capacitors to the set limit value.

11. An electrical storage system having a bank of capacitors for supplying a load, comprising:

- a charging means for charging said bank of capacitors that develops a terminal voltage thereacross;
- a temperature-detecting means for detecting temperature on or near said bank of capacitors;
- a discharging means in parallel with the load capable of discharging said bank of capacitors;
- a terminal voltage limit value-adjusting means for adjusting a limit value of said terminal voltage of said bank of capacitors so as to drop as the temperature detected by said temperature-detecting means rises; and
- a control means for causing said discharging means to discharge said bank of capacitors until said terminal voltage of said bank of capacitors reaches the limit value set by said terminal voltage limit value-adjusting means.

12. The electrical storage system of claim 11, wherein charging of said bank of capacitors by said charging means is limited by the limit value set by said terminal voltage limit value-adjusting means.

13. An electrical storage system having a bank of capacitors for supplying a load, comprising:

- a charging means for charging said bank of capacitors that develops a terminal voltage thereacross;
- a temperature-detecting means for detecting temperature on or near said bank of capacitors;
- a discharging means in parallel with the load capable of discharging said bank of capacitors;
- a setting means for setting a limit value of said terminal voltage of said bank of capacitors; and
- a control means for causing charging of said bank of capacitors by said charging means to be limited by said limit value set by said setting means if the temperature detected by said temperature-detecting means is in excess of a preset temperature, said control means causing said discharging means to discharge said bank of capacitors to said limit value set by said setting means.

* * * * *